United States Patent [19]

Hanson et al.

[11] Patent Number: 4,815,367
[45] Date of Patent: Mar. 28, 1989

[54] FLASHLIGHT POWERED COOKING ROTISSERIE

[76] Inventors: Todd A. Hanson; Karen E. Hanson, both of 225 1st Ave. West, Havre, Mont. 59501

[21] Appl. No.: 80,655

[22] Filed: Aug. 3, 1987

[51] Int. Cl.⁴ .............................................. A47J 37/04
[52] U.S. Cl. ................................................. 99/421 H
[58] Field of Search ......... 99/421 R, 421 H, 421 HH, 99/421 HV

[56] References Cited

U.S. PATENT DOCUMENTS

| | | | |
|---|---|---|---|
| 3,059,568 | 10/1962 | Fortis | 99/421 H |
| 3,104,605 | 9/1963 | McKinney | 99/421 H |
| 3,387,555 | 6/1968 | Moran | 99/421 HV |
| 3,802,330 | 4/1974 | Graziani | 99/421 H |
| 4,539,751 | 9/1985 | Chan | 99/421 A |

FOREIGN PATENT DOCUMENTS

| | | | |
|---|---|---|---|
| 344538 | 3/1960 | Switzerland | 99/421 HH |
| 2083343 | 3/1982 | United Kingdom | 99/421 HH |

Primary Examiner—Henry J. Recla
Assistant Examiner—Linda J. Sholl
Attorney, Agent, or Firm—Leon Gilden

[57] ABSTRACT

This portable barbecue device utilizes an automatically operated rotating spit mechanism, commonly referred to as a rotisserie, which is powered by a conventional flashlight. The flashlight is modified to operate a small direct current motor to which the rotisserie is mounted.

1 Claim, 3 Drawing Sheets

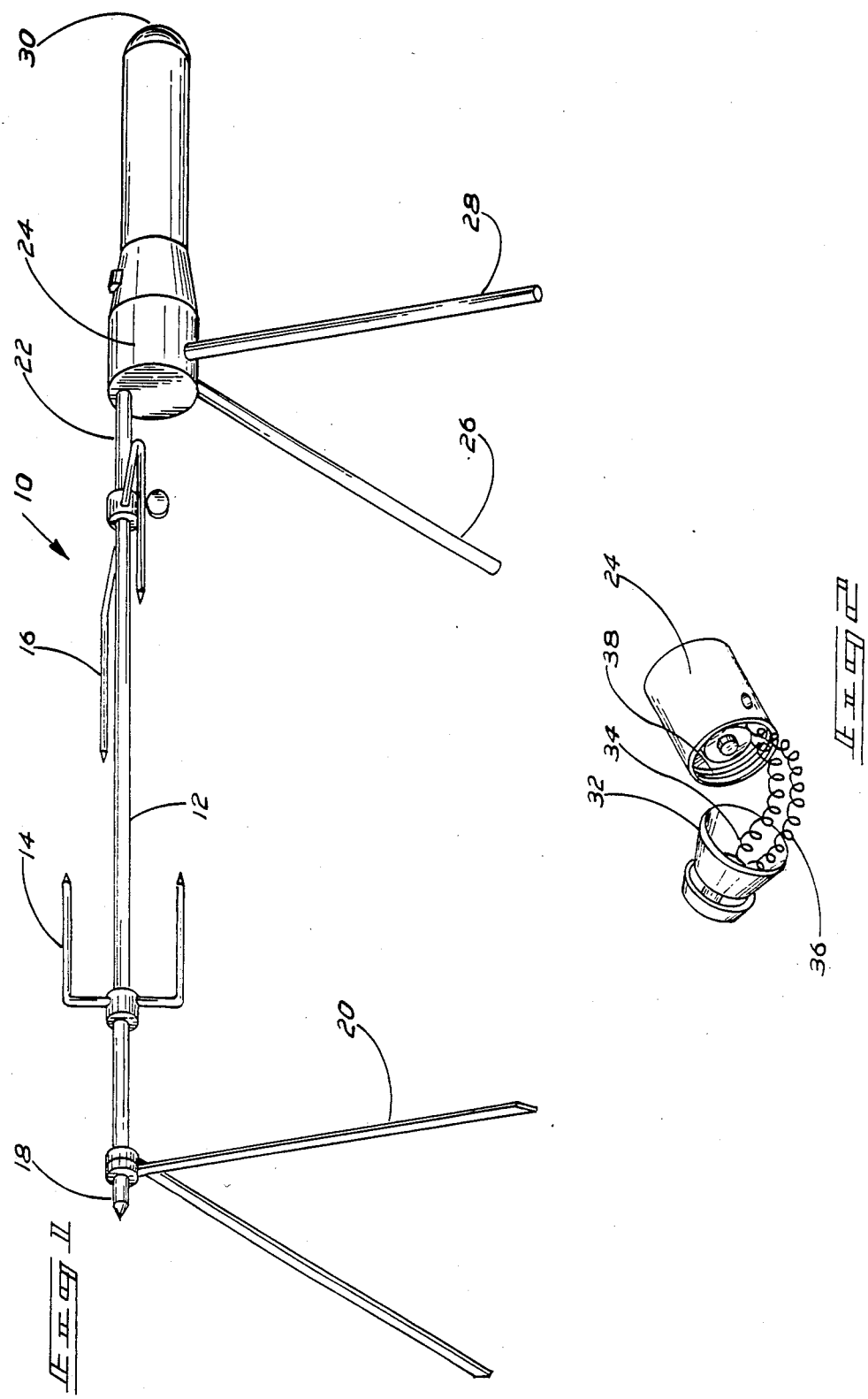

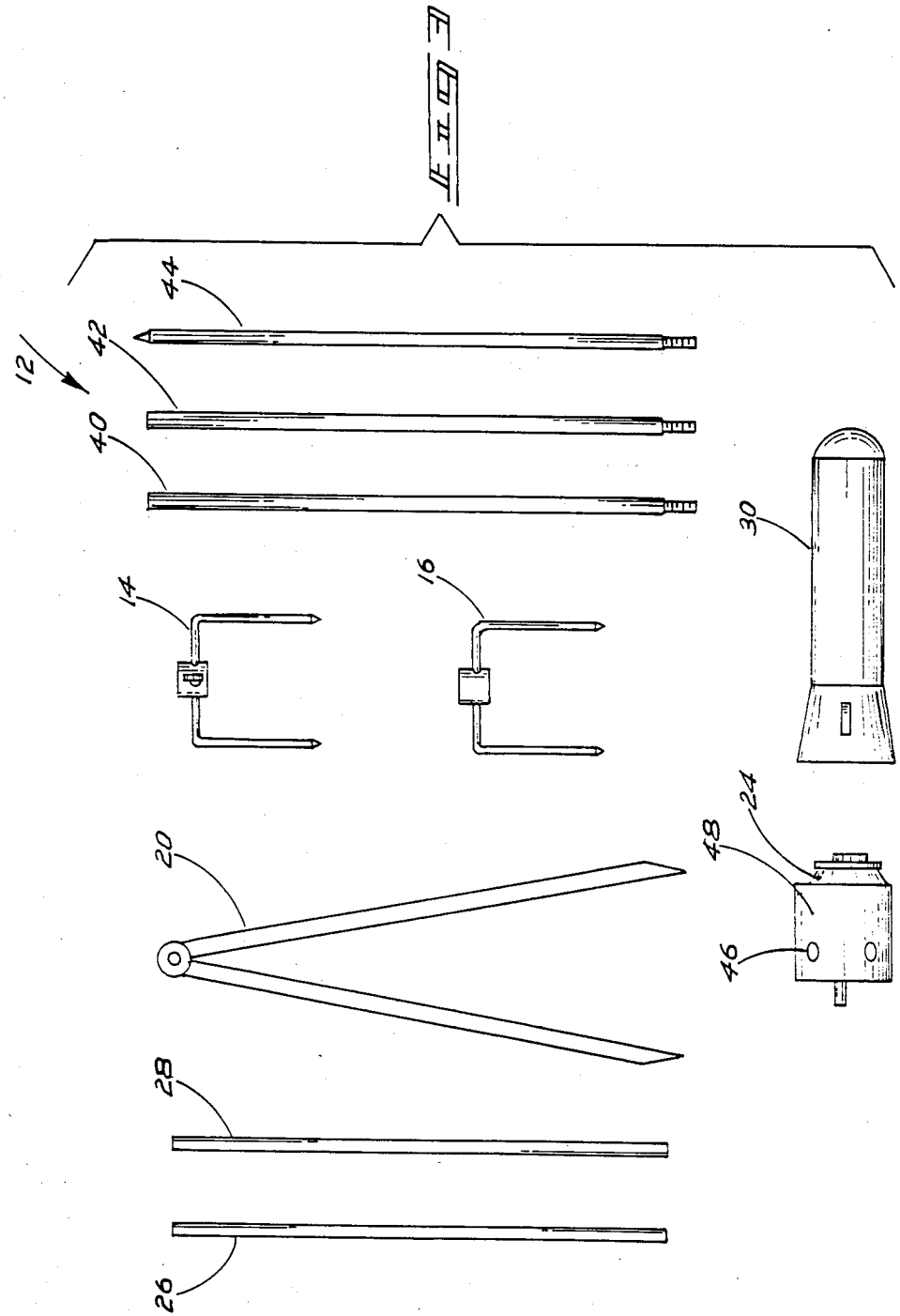

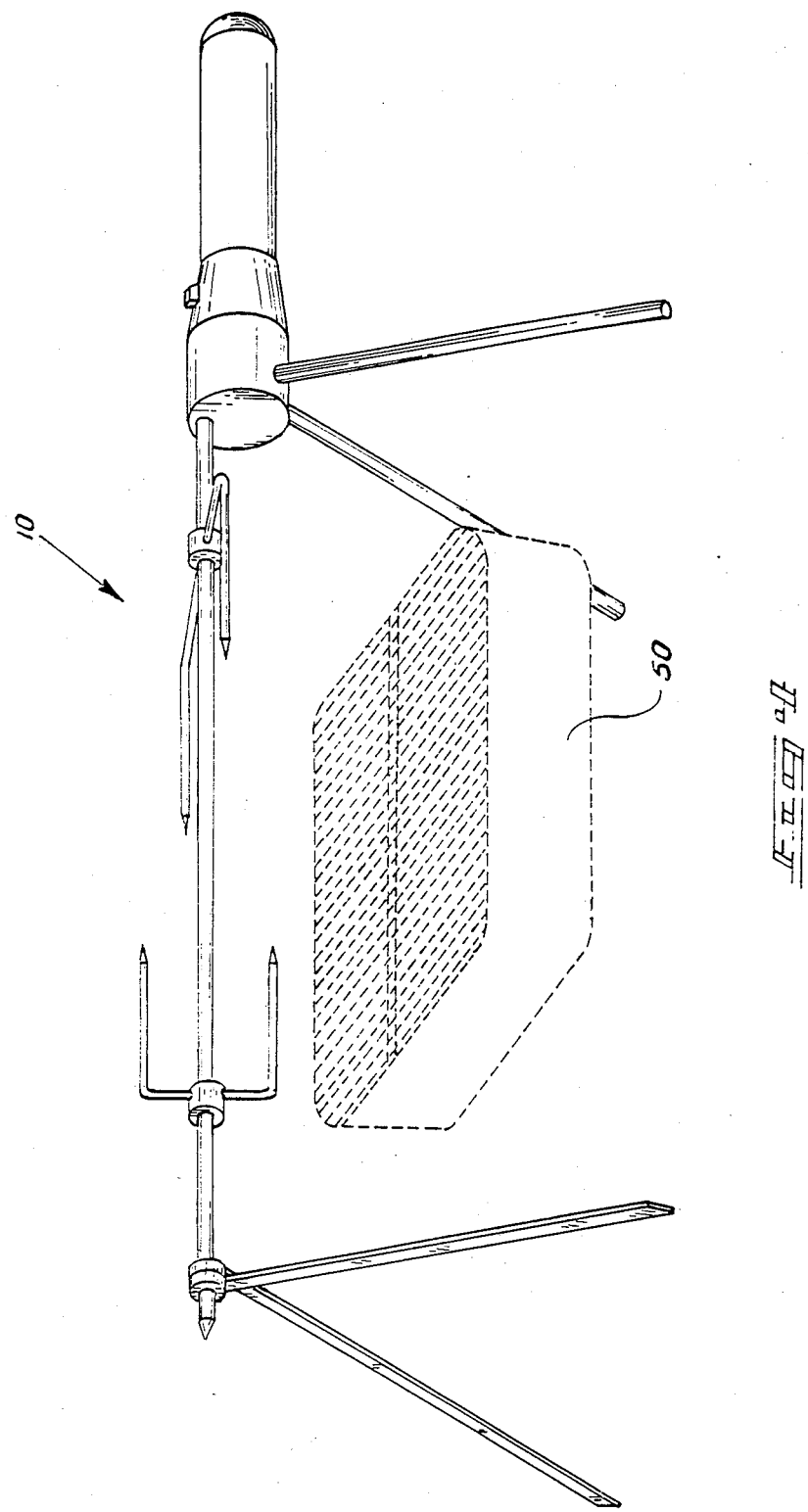

FLASHLIGHT POWERED COOKING ROTISSERIE

BACKGROUND OF THE INVENTION

1. Field of the Invention

The present invention relates to portable barbecue devices, and more particularly pertains to an automatically operated rotating spit mechanism for a barbecue device.

2. Description of the Prior Art

Barbecue stands which include a rotating spit or rotisserie driven by an electric motor are well known in the prior art. A good example of such a prior art motor driven rotisserie is to be found in U.S. Pat. No. 3,104,605 which issued to C. McKinney on Sept. 24, 1963. This patent is illustrative of a far larger number of patents which have issued and which are directed to the use of motor driven rotisseries in combination with barbecue stands. While being functional for their intended purpose, all of these prior art devices have the distinctive disadvantage of requiring a convenient electric outlet to operate the associated motor which rotates the spit. As such, these prior art barbecue devices cannot be used on camping trips, beach outings, and the like where electric power is not readily available.

However, there has been a recognition of this problem as illustrated in U.S. Pat. No. 3,059,568 which issued to J. Fortis on Oct. 23, 1962. The patent to Fortis discloses a rotisserie which is designed for use at picnics or other outings without requiring an external source of electrical power since the invention is designed to be used by either a spring-driven or battery-driven motor. While the basic concept of using a battery-driven motor to facilitate the rotation of a rotisserie is known in the art, it will be noted that the Fortis device is substantially complex in design and requires the manufacture of a large number of different metallic interfitting parts. Due to the complex design of this device, little or no apparent commercial success has been achieved—most likely due to the apparent expense and complexity of manufacture.

As such, there appears to be a need for new and improved portable rotisserie devices which could use battery-driven motors and which could be inexpensively and easily manufactured to improve their chances of commercial acceptability. In this regard, the present invention substantially fulfills this need.

SUMMARY OF THE INVENTION

In view of the foregoing disadvantages inherent in the known types of portable rotisseries now present in the prior art, the present invention provides an improved portable rotisserie wherein the same can be easily and inexpensively manufactured while being utilizable in combination with a modified battery-powered flashlight. As such, the general purpose of the present invention, which will be described subsequently in greater detail, is to provide a new and improved portable rotisserie which has all the advantages of the prior art portable rotisseries and none of the disadvantages.

To attain this, the present invention includes the use of a rotisserie rod which may be threadably assembled and which may have conventional meat and fowl holding forks attached thereto. The rotisserie rod is supported on a pair of inexpensively manufactured stands and a small battery-powered electric motor is attachable to one end of the rotisserie rod. A conventional flashlight is attachable to the electric motor and is wired thereto so as to provide a source of electric power for operating the motor. The flashlight and motor may be retained within a housing which operates to both protect the motor and flashlight from the elements while also serving as an interconnection means therebetween. The adjustable construction of the invention allows the same to be positioned over a small charcoal grill or fire pit in a now apparent manner.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out it various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved portable rotisserie which has all the advantages of the prior art portable rotisseries and none of the disadvantages.

It is another object of the present invention to provide a new and improved portable rotisserie which may be easily and efficiently manufactured and marketed.

It is a further object of the present invention to provide a new and improved portable rotisserie which is of a durable and reliable construction.

An even further object of the present invention is to provide a new and improved portable rotisserie which is susceptible of a low cost of manufacture with regard to both materials and labor, and which accordingly is then susceptible of low prices of sale to the consuming public, thereby making such portable rotisseries economically available to the buying public.

Still yet another object of the present invention is to provide a new and improved portable rotisserie which provides in the apparatuses and methods of the prior art some of the advantages thereof, while simultaneously overcoming some of the disadvantages normally associated therewith.

Still another object of the present invention is to provide a new and improved portable rotisserie which is of a battery-driven design and which makes use of a conventional battery-powered flashlight as its source of electrical energy.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the flashlight powered cooking rotisserie comprising the present invention.

FIG. 2 is a perspective view illustrating the manner of attachment of the flashlight to the associated electric motor forming a part of the present invention.

FIG. 3 is a plan view of the operable components of the invention when disassembled.

FIG. 4 is a perspective view of the invention showing its manner of use with a barbecue grill.

DESCRIPTION OF THE PREFERRED EMBODIMENT

With reference now to the drawings, and in particular to FIG. 1 thereof, a new and improved flashlight powered cooking rotisserie embodying the principles and concepts of the present invention and generally designated by the reference numeral 10 will be described.

More specifically, it will be noted that the cooking rotisserie 10 essentially includes a rotatable rotisserie rod 12 having a pair of meat and fowl holding hooks 14, 16 adjustably fixedly secured thereto. The rod 12 has one end 18 thereof rotatably supported within a rotisserie support rod stand 20, while the opposed end 22 of the rod is attached to and supported by a geared battery-driven electric motor 24. The motor 24 is retained within a housing to which a pair of support rods 26, 28 are removably attached. Battery power is supplied to the motor 24 by a battery powered flashlight 30 operably attached thereto.

FIG. 2 of the drawings illustrates the manner of establishing electrical communication between the flashlight 30 and the battery driven motor 24. As illustrated, the conventional reflector unit 32 forming a part of the flashlight 30 has been removed for purposes of more particularly describing the invention. The reflector unit 32 has had its conventional light bulb removed therefrom, and a pair of electrical conductors 34, 36 are appropriately attached between the flashlight receptacle attachment and the power receiving connections of the motor 24. The reflector unit 32 may then be threadably or otherwise adhesively attached to the housing of the motor 24. In a preferred embodiment, a waterproof adhesive is utilized to effect the desired attachment between the reflector 32 and the motor 24, while the housing of the motor may be provided with internal threads 38 to facilitate a threaded attachment of the flashlight 30 thereto. This construction then provides a secure weatherproof connection between the flashlight 30 and the motor 24, while also facilitating a rapid disengagement of the flashlight from the motor for the purpose of replacing batteries or performing other maintenance.

One of the more desirable features of the invention includes its ability to be disassembled and compactly stored. In this regard, reference is made to FIG. 3 of the drawings wherein the invention 10 is shown in a disassembled array. In the preferred embodiment, the rotisserie rod 12 may be threadably disconnected into three separable components 40, 42, 44, while the meat and fowl holding forks 14, 16 are slidably disconnected therefrom. The rotisserie rod stand 20 is also slidably disconnectible from the rotisserie rod 12, and the support rods 26, 28 may be manually disengaged from respective rod-receiving apertures 46, 48 formed in the housing of the motor 24. As aforementioned, the flashlight 30 may be threadably disconnected from the motor housing 24 to thus complete the disassembly of the invention 10.

As to the manner of usage and operation of the invention, the same should be apparent from the above description. However, FIG. 4 of the drawings has been provided to illustrate one anticipated manner of usage for the invention 10. In this respect, the flashlight powered cooking rotisserie 10 may be selectively positioned over a conventional barbecue 50 during a use thereof in a now apparent manner. Of course, the barbecue 50 is illustrative of any type of stove arrangement which could be utilized in combination with the present invention and the concept of the invention extends additionally to open fire pits and the like.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A portable cooking rotisserie comprising:
   rotisserie rod means for selective and slidable securement of a plurality of food holding forks;
   first support means for rotatably supporting a first end of said rotisserie rod means;
   second support means for rotatably supporting a second end of said rotisserie rod means;
   electric motor means for effecting a rotation of said rotisserie rod means;
   and a cylindrical shaped housing surrounding said electric motor means; and battery-powered flashlight means operably attached to said electric motor means for providing a power supply means for said electric motor means, and wherein said first support means comprises a fork-shaped support stand, said rotisserie rod means being rotatably supported within a continuous ring member positioned on an apex portion of said stand, said continuous ring member having two rod members extending directly therefrom to form said fork-shaped support stand.

wherein said second support means comprises first and second removable rods threadedly and removably attachable directly to said cylindrical shaped housing to facilitate storage and transport, and wherein said flashlight means includes a light bulb receptacle attachment, said light bulb receptacle attachment being electrically attached to said electric motor means by flexible conductors, and wherein said flashlight means includes a manually operable switch for controlling a delivery of electrical power to said electric motor means, and wherein said electric motor means is geared, and wherein said rotisserie rod means further comprises a plurality of threadably securable separable components, thereby to facilitate a storing and transporting thereof, said separable components defining smooth exterior cylindrical surface of said rotisserie rod means.

* * * * *